United States Patent [19]

Priaroggia

[11] Patent Number: 4,690,498
[45] Date of Patent: Sep. 1, 1987

[54] PRESSURE RESISTANT SUBMARINE OPTICAL FIBER CABLE

[75] Inventor: Paolo G. Priaroggia, Milan, Italy

[73] Assignee: Società Cavi Pirelli S.p.A., Milan, Italy

[21] Appl. No.: 723,039

[22] Filed: Apr. 15, 1985

[30] Foreign Application Priority Data

Apr. 19, 1984 [IT] Italy .................. 20621 A/84

[51] Int. Cl.$^4$ ................................. G02B 6/44
[52] U.S. Cl. ....................... 350/96.23; 174/70 R
[58] Field of Search ............ 174/70 R; 350/96.23

[56] References Cited

U.S. PATENT DOCUMENTS

| 4,361,381 | 11/1982 | Williams | 350/96.23 |
| 4,389,088 | 6/1983 | Trezequet | 350/96.23 |

FOREIGN PATENT DOCUMENTS

| 0026952 | 4/1981 | European Pat. Off. | 350/96.23 |
| 2021282 | 11/1979 | United Kingdom . | |
| 2040063 | 8/1980 | United Kingdom | 350/96.23 |
| 2064811 | 6/1981 | United Kingdom | 350/96.23 |
| 1598540 | 9/1981 | United Kingdom | 350/96.23 |
| 2099173 | 12/1982 | United Kingdom | 350/96.23 |

*Primary Examiner*—John Lee
*Attorney, Agent, or Firm*—Brooks Haidt Haffner & DeLahunty

[57] ABSTRACT

A submarine cable with optical fibers which prevents damage to the fibers due to water pressure without the use of an external armor. The cable has a central core with a strand which provides the cable tensile strength and which is surrounded and contacted by a layer of plastic material having helical grooves which receive the optical fibers which may have a protective covering. The layer of plastic material is surrounded by a thin metal sheath which, in turn, is closely surrounded by a layer of plastic material. The grooves and any spaces radially inwardly of the sheath, such as the spaces between the wires of the strands, are filled with a practically incompressible fluid, such as a grease or jelly. If the optical fiber protective layer is a tube loosely receiving the optical fiber, or optical fibers, the space within the tube not filled by optical fibers is filled with a substantially incompressible fluid. A further layer of plastic material may be interposed between the metal sheath and the plastic material layer of the core and may at least partially extend into the grooves.

14 Claims, 4 Drawing Figures

PRESSURE RESISTANT SUBMARINE OPTICAL FIBER CABLE

The present invention relates to a telecommunication, optical fiber, submarine cable and in particular to a telecommunication, optical fiber, submarine cable adapted to operate at great depths, and therefore, in an ambient which will exert a substantial hydrostatic pressure on the cable.

These severe ambient conditions in which an optical fiber, submarine cable must operate means that one must pay maximum attention to the avoidance of damage to the cable by the external pressures i.e. risk of collapse of the cable structure. In fact, a collapse of the cable would produce alterations in the configuration of the cross-section of the structure and when these alterations involve the part of the cable where the optical fibers are disposed, the fibers are subjected to mechanical stresses. The consequence could be a rupture of the optical fibers, which, as is known, are very delicate, and therefore, the cable could be put out of operation.

In addition, unsatisfactory operation of the cable could occur without a rupture of the optical fibers if the mechanical stresses applied to the fibers should cause an attenuation of the signals transmitted.

For these reasons, a metallic structure is provided in the structure of the known optical fiber, submarine cables around the zone where the optical fiber is located. The thickness of the metallic structure increases with the depth at which the cable is to be laid to make the metallic structure resistant to the hydrostatic pressure action. An example of the known telecommunication, optical fiber, submarine cables, is described in the British Pat. No. 2,021,282. This known cable, which is considered to be particularly suitable to be laid at great depths, is provided with a metallic structure, resistant to the compressive stresses exerted in the radial direction on the cable, around a core incorporating the optical fibers. Moreover, in the cable according to said British patent, a structure resistant to the tensile stresses, which is necessary in any type of submarine cable for carrying out the laying operations, is arranged around said metallic structure resistant to the compressive stresses exerted in the radial direction on the cable.

Another example of known telecommunication, optical fiber, submarine cables is described in the Australian patent application No. 74368/81. The cable described in this patent application, where the optical fibers are housed in grooves present on the surface of a cylindrical core enclosed within a metal sheath, is provided with a mechanically resistant armor of steel wires arranged around said sheath.

From the known telecommunication, optical fiber, submarine cables, it is evident that those skilled in the art feel that there is a need to provide a mechanically resistant armor which surrounds the bundle of optical fibers and that said armor must have greater dimensions when the depth at which the cable will be laid is greater.

Bearing in mind that in the prior art structures, the metallic armor for surrounding the optical fibers is far from the bending neutral axis of the cable, which, as is known, coincides with the geometrical axis of the cable, the cable flexibility is negatively influenced making the laying operations complicated.

Finally, the great quantities per linear meter of metals present in the known telecommunication, optical fiber, submarine cables increases the risks of "blinding" the optical fibers in consequence of the hydrogen that can develop from said metals and contact the optical fibers.

One object of the present invention is to avoid the stated drawbacks of the known telecommunication, optical fiber, submarine cables and in particular of the known telecommunication, optical fiber, submarine cables used at great depths.

The principal object of the present invention is a telecommunication, optical fiber, submarine cable comprising a cylindrical core whose outermost surface is provided with helical grooves, each groove receiving at least an optical fiber and said cylindrical core being enclosed within a water-tight metal sheath, characterized by the fact that said cylindrical core is constituted by a plastic material which is secured to, and in which is embedded, an armor disposed at the radially innermost position of the cable and having an axis which coincides with the cable axis. The armor is constituted by a compact anti-torsional strand, and the spaces between the wires forming said strand are filled with a substantially incompressible fluid. The helical grooves of said cylindrical core, receiving said optical fiber, are filled with a substantially incompressible fluid and said cable is devoid of any armor which, by itself, can withstand the mechanical stresses and which is arranged radially outwardly and surrounding the zone where the optical fibers are disposed.

In this specification, the term "incompressible fluid" means liquid substances, preferably viscous and having a high viscosity, but excludes a gas.

The compact anti-torsional strand constituting the armor of a submarine cable, according to the present invention, is selected to withstand substantially all the tensile stresses encountered during the laying of the cable.

The optical fibers are loosely received in the helical grooves filled with an incompressible fluid and can be bare or have a protective means of the "tight" type or the "loose" type as defined hereinafter. In this latter case, the grooves receive at least a tube filled with an incompressible fluid and at least an optical fiber is loosely enclosed in the tube. The space comprised between the tube and the groove is filled with an incompressible fluid.

In the alternative, the space between the tubes and the grooves is filled with a plastic material which penetrates into said grooves and eliminates any empty space around the tubes, said plastic material forming a layer interposed between the metal sheath and the outermost surface of the cylindrical core.

In this way, the plastic material interposed between the metal sheath and the outermost surface of the cylindrical core has ribs which assume a profile complementary to that of the tube encased in a helical groove.

Other objects and advantages of the present invention will be apparent from the following detailed description of the presently preferred embodiments thereof, which description should be considered in conjunction with the accompanying drawings in which:

FIG. 1 illustrates a telecommunication, optical fiber, submarine cable according to the present invention 10 which is particularly suitable for laying at great depths, the term "great depths" meaning depths greater than 1000 meters. At such depth, the water exerts a pressure of about 100 Kg/cm² on the cable.

Figure 1:
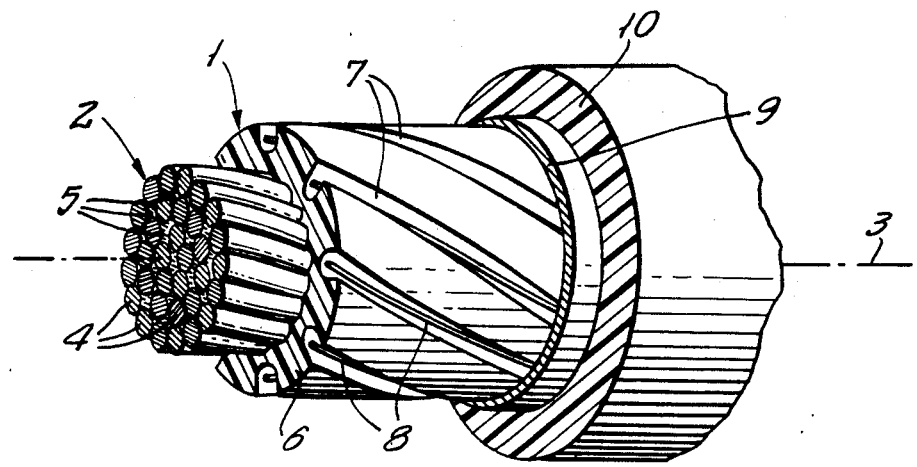
FIG. 1 is a perspective view of a portion of a telecommunication optical fiber submarine cable according to the present invention with portions removed in order to clarify the structure.

As shown in FIG. 1, the cable comprises a cylindrical core 1 of plastic material which surrounds, contacts and is secured to an armor 2 disposed so as to occupy the radially innermost position of the core 1 and to have its axis coincident with the axis 3 of the cable.

The armor 2 is selected, and therefore, sized, to withstand substantially all the tensile stresses which are applied to the cable during its laying and is constituted by a compact anti-torsional strand formed by a plurality of wires 4 of a material having a very high mechanical resistance to traction, such as, for example, steel. When the cable is to be used at a depth of the order of 1000 meters, the armor 2 may have a diameter of 6 to 12 mm., a diameter of 8 mm. being suitable.

The wires 4 forming the strand constituting the armor 2, are helically disposed in overlapped coaxial layers, and the winding direction of the wires of one layer is opposite to that of the wires of the adjacent layers. In this way the strand, when subjected to traction does not twist and has a very good flexibility. Moreover, the wires 4 can have, in cross-section, a circular shape or a shape which reduces the spaces between the adjacent wires, such as, for example, a trapezoidal shape, a Z-like shape and the like.

The spaces 5 which are unavoidably present between the wires 4 are filled with a practically incompressible fluid, such as, for example, a petroleum jelly, a silicone grease and the like.

Around the compact anti-torsional strand constituting the armor 2 of the cable, there is a layer 6 of plastic material. Said layer 6 contacts and is secured to the outer surface of the armor 2, and any possible space which may be present between the layer 6 and the armor 2 is filled with a practically incompressible fluid, such as, for example, the same incompressible fluid filling the spaces 5 between the wires 4. The layer 6 may have a thickness up to 1 mm., greater than the depth of the grooves 7, hereinafter described, and may, for example, have a thickness of the order of 1.5 mm.

A plastic material for the formation of the layer 6 can be, for example, a polyolefine such as polyethylene. Preferably, although not necessarily, the plastic material of the layer 6 is selected from those having the lowest coefficient of thermal expansion, such as polypropylene, polyvinylchloride, nylon and the like.

The outer surface of the core 1 is provided with helical grooves 7 filled with an incompressible fluid like that which fills the spaces existing between the wires 4 of the armor 2. Each helical groove 7, the characteristics of which will be described in detail later herein, receives in a loose manner at least an optical fiber 8.

A water-tight metal sheath 9 is present around the cylindrical core 1 and is in contact with the outermost surface of the core 1. The metal sheath 9 provides a closing wall for the grooves 7 which are completely filled with an incompressible fluid and loosely receive the optical fibers, and therefore, there are no free spaces between said metal sheath 9 and the cylindrical core 1.

The metal sheath 9 has only a waterproofing function and does not constitute, and need not constitute in practice, an armor for the cable which, by itself, is resistant to the stresses on the cable both in the longitudinal direction and in the transverse direction. The metal sheath 9 has a thickness, for example, of some tenths of a millimeter. Generally, the thickness of the sheath 9 has the minimum value which will meet the construction needs, and said thickness remains substantially constant whatever the depth at which the cable is to be laid and operated may be.

The sheath 9, if of aluminum, can be obtained through extrusion. As an alternative, the sheath 9 can be obtained by winding a metallic tape longitudinally on the core, for example, a tape of aluminum or other metallic materials, so as to place in the longitudinal edges of the tape in mutual contact, securing them to each other by a soldering operation. If the longitudinal edges of the tape are overlapped, they may be sealed together in a water-tight manner with mastics and the like.

Around the metal sheath 9, there is a layer of plastic material 10, for example, a polyolefine such as polyethylene.

Other layers not shown in the FIG. 1 can be present on the layer 10, such as, for example, an anti-ship-worm protection of type known per se, but none of these layers, by themselves, will be constructed so as to provide an armor for the cable which can withstand the mechanical stresses to which the cable is subjected during laying or operation.

In this way, a telecommunication, optical fiber, submarine cable according to the present invention is without any armor which is resistant to the mechanical stresses and which is disposed radially outwardly with respect to the zone occupied by the optical fibers or with respect to the water-tight sheath.

As previously said, the helical grooves 7, filled with a substantially incompressible fluid, loosely receive the optical fibers 8. The helical grooves 7 have a width measured at the outer surface of the core 1 and a depth not greater than 5 mm., and preferably, in the range from 0.5 to 1.5 mm., for example, mm.

The optical fibers 8 can be bare or provided with a protection means of the "tight" type or of the "loose" type.

In this specification, by the term protection means of the "tight" type for an optical fiber is meant that the optical fiber is covered with at least a layer of plastic material adherent to the fiber. In the case in which the optical fibers have a protection means of the "loose" type, i.e. when an optical fiber is housed within a tube, the tube can be of plastic material or metallic material, and said tube is filled with a substantially incompressible fluid, such as, for example, a petroleum jelly, a silicone grease and the like. The thickness of the tube wall depends on the volume of the spaces free from the practically incompressible fluid which for any reason could be present within the tube itself. In fact, if the tube is not completely filled with a practically incompressible fluid, the tube must itself have a greater mechanical resistance to the radial compressive stresses because of the smaller support which can be supplied to the inner wall of the tube by the practically incompressible fluid.

Figure 2:
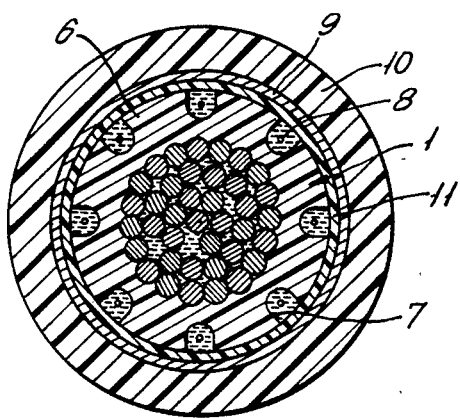
FIG. 2 is a transverse, cross-sectional view of an alternative embodiment of a cable according to the present invention.

FIG. 2 illustrates an alternative embodiment of a telecommunication, optical fiber, submarine cable according to the present invention. The cable shown in FIG. 2 differs from that of FIG. 1 only by reason of the fact that between the metal sheath 9 and the outer surface of the core 1, there is interposed a layer 11 of plastic material. The plastic material forming the layer 11 can be the same as, or different from, the plastic material forming the layer 6 of the core 1 and may have a thickness of up to 1 mm., and may, for example, be 0.5 mm., thick.

As is shown in FIG. 2, the layer 11 of plastic material is a tubular layer having an inner circular surface in cross-section and is in direct contact with the outermost surface of the core 1. Consequently, the inner surface of the tubular layer 11 provides a closing wall for the grooves 7 which are completely filled with an incompressible fluid and loosely receive the optical fibers 8. If desired, the plastic material of the layer 11 may extend partly into the grooves 7 so that there are ribs 11a which project from the inner surface of the layer 11 into the grooves 7 as indicated in FIG. 2a.

Figure 2A:
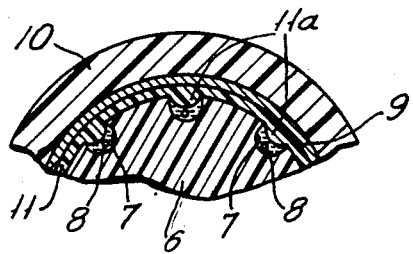
FIG. 2a is a fragmentary, cross-sectional view of a modification of the embodiment shown in FIG. 2.

In the embodiments of FIGS. 2 and 2a, the optical fibers loosely received in the helical grooves 7 can be bare or provided with a protection of the "tight" type or the "loose" type.

Figure 3:
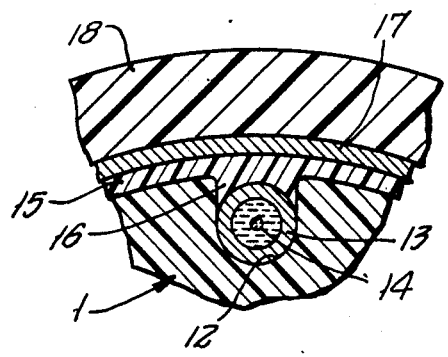
FIG. 3 shows, in enlarged scale and in cross-section a portion of a further embodiment of a cable according to the present invention.

When, in a cable according to the present invention, the optical fibers are provided with a protection of "loose" type, there is a further alternative embodiment which differs from that of the cable shown in FIG. 2 and which is shown in FIG. 3.

As shown in FIG. 3, within the helical grooves 12 present on the outer surface of the cable core 1, there is a tube 13 of plastic or metallic material, filled with a substantially incompressible fluid, such as, for example, a petroleum jelly, a silicone grease and the like, and enclosing an optical fiber 14. The helical grooves 12 have, in cross-section, a bottom of circular profile the radius of which is the same as that of the outer surface of the tube 13, and therefore, the tube 13 is in contact with the bottom of the helical grooves 12.

In direct contact with the outermost surface of the core 1, there is a tubular layer 15 of plastic material provided with ribs 16 projecting from its inner surface which penetrate into the helical grooves 12 filling all the spaces left free by the tube 13 and assuming a profile complementary to the exterior of the tube 13. Consequently, the ribs 16 have a semi-circular cavity of a radius which is the same as the radius of the outer surface of the tube 13.

Both the plastic material of the layer 15 and that of the tube 13, if this latter is of plastic material, are for example, a polyolefine such as polyethylene, or they may be made of different plastic materials, for example, a polyolefine for the layer 15 and nylon for the tube 13. Such tubes 13 are described in U.S. Pat. No. 4,153,332, and for a tube 13 enclosing one optical fiber, the internal diameter and external diameters of the tube 13 may, for example, be 1 mm., and 2.5 mm, respectively. However, the internal diameter may be in the range from about 0.75 mm., to about 1.5 mm., and the external diameter may be in the range from about 1.8 mm., to about 3 mm., depending on the internal diameter used.

On the layer of plastic material 15 and in direct contact with it, there is present a water-tight metal sheath 17 which is identical to that of the embodiments shown in FIGS. and 2 and which is covered with a layer of plastic material 18.

In all the previously described embodiments of telecommunication, optical fiber, submarine cables according to the present invention, the armor 2, constituted by a compact anti-torsional strand, has the wires 4 of a material at very high mechanical resistance, such as, for example, steel.

In place of steel wires, the compact, anti-torsional strand constituting the armor 2 may be made of threads of material having a mechanical resistance comparable with the steel, such as, for example, threads of aromatic polyamide or threads of carbon fibers. The term "wires", as used herein, is intended to include threads of such materials.

Also, in the case of an armor formed by polyamide aromatic threads or by carbon fiber threads, the spaces existing between them are completely filled with a substantially incompressible fluid, such as, for example, a petroleum jelly, a silicone grease and the like.

The armor 2 of the cable strand can comprise a longitudinal metallic element of high electrical conductivity so as to provide an electric conductor for feeding any optoelectronic repeaters of the signals transmitted by the optical fibers which may be disposed along the cable, the other conductor being constituted by the metallic sheath 9.

For example, the longitudinal metallic element of high electric conductivity may be a copper wire embedded in or wound around the strand constituting the armor 2 of the cable. If there are a sufficient number of wires 4 remaining, one of the wires 4 may be replaced by a copper wire.

From the previous description of some embodiments according to the present invention and from the considerations which will be given hereinafter, it will be understood how the objects of the invention are attained.

First of all, by means of the solution according to the present invention, it is possible to reduce to the minimum the mechanically resistant armor of a submarine cable, especially for great depths, eliminating, contrary to what was considered up to now absolutely necessary for avoiding collapse of the cable under the action of the hydrostatic pressure, the presence of any external metallic armor, able to withstand substantially by itself all the mechanical stresses around the zone occupied by the optical fibers.

This surprising result is attributed to the fact that the entire cable stress resistant armor is in the form of an anti-torsional strand in the radially innermost zone of the cable core of plastic material with its axis coincident with the cable axis, and the spaces between the wires of the strand, but also any space existing between the cable core and the water-tight metal sheath of the cable, and in particular, the helical grooves present on the surface of the core which receive at least an optical fiber, are filled with a substantially incompressible fluid.

In this way, should very small empty spaces which are not filled by the incompressible fluid remain in the components of the cable structure, due to unavoidable imperfections during the manufacture, no risks of collapse arise for the cable even under the very high pressures which occur with the laying of the cable at great depths, such as, for example, depths greater than 1000 meters.

Moreover, when the optical fibers are loosely received within the tubes of plastic or metallic material which are filled with a substantially incompressible fluid, the tubes can themselves have a mechanical resistance to the radial compressive stresses which will avoid any risk because of an incomplete filling of the tubes with a substantially incompressible fluid.

The fact that the entire armor of a cable is concentrated in the radially innermost zone of a cable with the armor axis coincident with the cable axis and the fact that the size of said armor is selected so as to withstand, in practice, only the tensile stresses occurring during the laying, permit the reduction to the minimum of the volume of the metal present. This means that it is possible to have cables with a weight reduced to the minimum and with the maximum of flexibility.

Moreover, the reduction to the minimum of the volume of metallic material per linear meter length of cable, made possible by the solutions according to the present invention, also reduces to the minimum the quantity of hydrogen which can be emitted by said metals and consequently, reduces the risks of "blinding" the optical fibers by said hydrogen Finally, in a cable according to the present invention, the use of an electric conductor of good conductivity in parallel with the metallic armor, permits the use of the conductor and the metal sheath for feeding the opto-electronic repeaters of the signals transmitted by the optical fibers with electric power and avoids the need to rely on the sea surrounding the cable for the function of return conductor.

In the cable of the invention, the function of dielectric is carried out by the plastic material interposed between the armor and the metal sheath and not by a layer of plastic material covering the sheath. In the cable of the invention, the layer of plastic material covering the sheath, which is unavoidably subjected to the sea action, is not subjected, as contrasted to the known cables, to electric stresses, to those electrochemical phenomena which lead to the formation within said layer of the so-called water-trees and to possible corrosion of the metal sheath.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A submarine, telecommunication cable comprising:
   a core comprising an axially disposed and extending armor formed by a strand of wires and a layer of plastic material around and adhering to said strand, said plastic layer having a plurality of spaced-apart, helical grooves therein extending longitudinally of said core and opening radially outwardly and said strand of wires having, by itself, a tensile strength sufficient to withstand the tensile stresses to which the cable is subjected during laying and recovery thereof;
   a substantially incompressible fluid disposed in and filling-up otherwise empty spaced within said layer of plastic material including any spaces between said wires;
   at least one optical fiber loosely received in each of said grooves;
   a substantially incompressible fluid disposed in and filling-up any othwise empty spaces in said grooves; and
   a water-tight metal sheath around said core, said sheath, by itself, having a resistance to compression which is insufficient to withstand the compression forces to which the cable is subjected during use;
   said cable being without armor externally of said layer of plastic material which, by itself, can withstand the mechanical stresses to which the cable is subjected in use;
   whereby said cable is able to withstand hydrostatic pressures to which it is subjected when submerged without any armor outwardly of the optical fiber or fibers which by itself can withstand such pressures.

2. A submarine, telecommunition cable as set forth in claim 1 wherein said wires are made of steel.

3. A submarine, telecommunication cable as set forth in claim 1 wherein said wires are made of an aromatic polyamide.

4. A submarine, telecommunication cable as set forth in claim 1 wherein said wires are made of carbon fibers.

5. A submarine, telecommunication cable as set forth in claim 1 wherein said armor further comprises a conductor having a conductivity greater than that of said wires.

6. A submarine, telecommunication cable as set forth in claim 5 wherein said conductor is made of copper.

7. A submarine, telecommunication cable as set forth in claim 1 wherein each of said grooves has a width at the outer surface of said layer of plastic material and a depth not greater than 5 mm.

8. A submarine, telecommunication cable as set forth in claim 7 wherein each of said optical fibers has a protective covering therearound.

9. A submarine, telecommunication cable as set forth in claim 8 wherein said protective covering is a tube having an inner diameter greater than the outer diameter of the optical fiber and received in a groove, the space within said tube not filled by an optical fiber being filled with a substantially incompressible, fluid.

10. A submarine, telecommunication cable as set forth in claim 9 wherein said tubes, by themselves, have a resistance to compression sufficient to withstand the compression forces to which the cable is subjected during use.

11. A submarine, telecommunication cable as set forth in claim 1 wherein said water-tight sheath has its inner surface in contact with said layer of plastic material.

12. A submarine, telecommunication cable as set forth in claim 1 further comprising a further layer of plastic material around and in contact with said first-mentioned layer of plastic material and wherein said water-tight metal sheath is around said further layer of plastic material.

13. A submarine, telecommunication cable comprising:
   a core comprising an axially disposed and extending armor formed by a strand of wires and a layer of plastic material around and adhering to said strand, said plastic layer having a plurality of spaced-apart, helical grooves therein extending longitudinally of said core and opening radially outwardly;
   a substantially incompressible fluid filling any otherwise empty spaced within said layer of plastic material including any spaces between said wires;
   at least one optical fiber loosely received in each of said grooves;
   a further layer of plastic material around and in contact with said first-mentioned layer of plastic material, said further layer extending at least partly into said grooves;

a substantially incompressible fluid filling any otherwise empty spaces in said grooves; and a water-tight metal sheath around said further layer of platic material, said sheath, by itself, having a resistance to compression which is insufficient to withstand the compression forces to which the cable is subjected during use;

said cable being without armor externally of the first mentioned said layer of plstic material which, by itself, can withstand the mechanical stresses to which the cable is subjected to use.

14. A submarine, telecommunication cable as set forth in claim 13 wherein each of said optical fibers is within a protective tube received in a groove, the space within said tube not filled by an optical fiber being filled with a substantially incompressible fluid and wherein said further layer of plastic material engages the tube in a groove.

* * * * *

UNITED STATES PATENT AND TRADEMARK OFFICE
CERTIFICATE OF CORRECTION

PATENT NO. : 4,690,498

DATED : September 1, 1987

INVENTOR(S) : Priaroggia

It is certified that error appears in the above-identified patent and that said Letters Patent is hereby corrected as shown below:

```
Col. 1, line 32, "whic:h" should read --which--;
Col. 5, line 67, insert --1-- after "FIGS.";
Col. 7, line 59, after "filling-up" insert --any--;
                change "spaced" to --spaces--;
Col. 8, line 59, change "pluraity" to --plurality--;
        line 63, change "spaced" to --spaces--;
Col. 9, line 6, change "platic" to --plastic--;
        line 11, change "plstic" to --plastic--.
```

Signed and Sealed this

Twelfth Day of January, 1988

Attest:

DONALD J. QUIGG

*Attesting Officer*   *Commissioner of Patents and Trademarks*